(12) United States Patent
Mitsue et al.

(10) Patent No.: US 9,931,677 B2
(45) Date of Patent: *Apr. 3, 2018

(54) CLEANING APPARATUS

(71) Applicant: SUGINO MACHINE LIMITED, Uozu, Toyama Prefecture (JP)

(72) Inventors: Toyoaki Mitsue, Toyama (JP); Yoshiteru Kawamori, Uozu (JP); Toru Sumiyoshi, Shimoniikawa-gun (JP)

(73) Assignee: SUGINO MACHINE LIMITED, Uozu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/428,374

(22) Filed: Feb. 9, 2017

(65) Prior Publication Data

US 2017/0189942 A1 Jul. 6, 2017

Related U.S. Application Data

(62) Division of application No. 14/477,245, filed on Sep. 4, 2014, now Pat. No. 9,630,217.

(30) Foreign Application Priority Data

Jul. 24, 2014 (JP) .................................. 2014-150837

(51) Int. Cl.
*B08B 3/02* (2006.01)
*B08B 9/00* (2006.01)
(Continued)

(52) U.S. Cl.
CPC ................ *B08B 3/024* (2013.01); *B08B 5/02* (2013.01); *B08B 9/00* (2013.01); *B25J 19/0075* (2013.01); *B25J 21/00* (2013.01)

(58) Field of Classification Search
None
See application file for complete search history.

(56) References Cited

U.S. PATENT DOCUMENTS 8,034,191 B2 10/2011 Leyendecker et al.
9,630,217 B2 * 4/2017 Mitsue .................... B08B 3/024
(Continued)

FOREIGN PATENT DOCUMENTS

EP 0 110 525 A1 6/1984
JP S63-72389 A 4/1988
(Continued)

OTHER PUBLICATIONS

Dec. 7, 2015 extended Search Report issued in European Patent Application No. 14183779.9.
(Continued)

*Primary Examiner* — Jason Ko
*Assistant Examiner* — Cristi Tate-Sims
(74) *Attorney, Agent, or Firm* — Oliff PLC (57) ABSTRACT

To provide a cleaning apparatus which is flexibly adaptable to a wide variety of workpieces so as to improve productivity while being suitably adaptable to high-pressure cleaning so as to improve cleaning work efficiency. The cleaning apparatus 10 for cleaning a workpiece W by jetting cleaning liquid from nozzles 22 disposed in a cleaning region E includes: a moving device 70; a feeding device 40 that is disposed facing the cleaning region E to hold and move the workpiece W; a holding device 17 that is disposed on the feeding device 40 to hold the workpiece W; a moving device 70 that movably supports the feeding device 40; and a cover device 14 that shields the moving device 70 from the cleaning region E and allows the feeding device 40 to pass therethrough. The feeding device 40 moves the workpiece W to the cleaning region E for cleaning.

2 Claims, 7 Drawing Sheets

(51) Int. Cl.
*B08B 5/02* (2006.01)
*B25J 19/00* (2006.01)
*B25J 21/00* (2006.01)

(56) References Cited

U.S. PATENT DOCUMENTS

2013/0233359 A1* 9/2013 Meissner .................. B08B 3/02
134/134
2016/0023254 A1 1/2016 Mitsue et al.

FOREIGN PATENT DOCUMENTS

| | | | |
|---|---|---|---|
| JP | H05-123999 A | 5/1993 |
| JP | H06-244291 A | 9/1994 |
| JP | H06-344291 A | 12/1994 |
| JP | H10-57916 A | 3/1998 |
| JP | H11-226523 A | 8/1999 |
| JP | 2004141811 A | 5/2004 |
| JP | 2010032038 A | 2/2010 |
| JP | 2010091073 A | 4/2010 |
| JP | 2012506005 A | 3/2012 |
| JP | 2012-76215 A | 4/2012 |
| JP | 201394933 A | 5/2013 |
| JP | 2013-544183 A | 12/2013 |
| WO | 2010043217 A1 | 4/2010 |

OTHER PUBLICATIONS

May 27, 2016 Office Action issued in U.S. Appl. No. 14/477,245.
Sep. 14, 2016 Office Action issued U.S. Appl. No. 14/477,245.

* cited by examiner

CLEANING APPARATUS

BACKGROUND

1. Field of the Invention

The present invention relates to a cleaning apparatus, and more particularly, to a cleaning apparatus including a feeding device for holding and moving a workpiece.

2. Description of the Related Art

A high-pressure cleaning machine is used for cleaning of products, particularly mechanical parts such as automobile parts. The high-pressure cleaning machine directs onto an object to be cleaned (hereinafter referred to as the "workpiece") high-pressure jets obtained by pressurizing cleaning liquid to a high pressure and jetting it from nozzles. At this time, cutting oil, chips or other foreign matters, or burrs on a work surface are removed by an impact force and cleavage force generated when the high-pressure jets impinge on the work surface. Because the jets change their orientation upon contact with the work surface to flow along the work surface, the high-pressure cleaning machine is suitable for cleaning and deburring of mechanical parts having outer surfaces with complicated shapes (for example, Japanese Published Unexamined Patent Application No. 2004-141811 (Claim 1, FIGS. 1 to 6) and U.S. Pat. No. 8,034,191 (FIGS. 9 to 15)).

The cleaning apparatus disclosed in the Japanese Published Unexamined Patent Application No. 2004-141811 performs cleaning by sequentially positioning while moving nozzles so that the nozzles face a single workpiece hole. The cleaning apparatus disclosed in the U.S. Pat. No. 8,034,191 performs cleaning by controlling the attitude of the workpiece while holding the workpiece with a multi-joint robot so that the workpiece is directed toward nozzles.

However, in the cleaning apparatus disclosed in the Japanese Published Unexamined Patent Application No. 2004-141811, there is a problem in that it takes a long time for cleaning because cleaning is performed by sequentially moving and positioning the nozzles so that the nozzles face a single workpiece hole. There is also a problem in that, when numerous holes to be cleaned are arranged or a wide surface is cleaned, the moving time of the nozzles becomes excessive, leading to deterioration in productivity because the range to be cleaned at a time is narrow.

In addition, there is also a problem in that, when the nozzles are moved in the same manner as the cleaning apparatus disclosed in the Japanese Published Unexamined Patent Application No. 2004-141811, the construction for ensuring the sealing performance is complicated in the case of supplying an ultrahigh-pressure cleaning liquid to the nozzles.

On the other hand, in the cleaning apparatus disclosed in the U.S. Pat. No. 8,034,191, there is a problem in that complex control is necessary to linearize the movement locus of the workpiece because the workpiece is held by the multi-joint robot and directed toward the nozzles by rotary motion. In the case of cleaning or deburring with high-pressure jets, the high-pressure jets need to strike the workpiece exactly along its outline. With the multi-joint robot, it is difficult to obtain high positioning accuracy, repeatability, or locus accuracy, and therefore a high cleaning or deburring effect is hard to obtain.

Furthermore, the multi-joint robot is directly splashed with the high-pressure water jetted from the nozzles or indirectly splashed with the high-pressure water bounced off the workpiece. Because the multi-joint robot is a precision component, unfortunately, it is likely to be damaged due to contact with high-pressure water.

SUMMARY

Accordingly, an object of the present invention is to provide a cleaning apparatus which is flexibly adaptable to a wide variety of workpieces so as to improve productivity while being suitably adaptable to high-pressure cleaning so as to improve cleaning work efficiency.

In view of the above-described problems, the present invention is constituted as follows.

An aspect of the present invention provides a cleaning apparatus for cleaning a workpiece by jetting cleaning liquid from nozzles disposed in a cleaning region includes: a feeding device that is disposed facing the cleaning region to hold and move the workpiece; a holding device that is disposed on the feeding device to hold the workpiece; a moving device that movably supports the feeding device; and a cover device that shields the moving device from the cleaning region and allows the feeding device to pass therethrough. The feeding device moves the workpiece to the cleaning region for cleaning.

It should be noted that in the following description, the term "cleaning" includes a wide range of operation, such as a work and processing performed by jetting high-pressure jets (such as cleaning liquid, water, and air) from nozzles, which is not particularly limited, but can also be used for, for example, removal of burrs formed by hole drilling or milling, or air blowing.

According to the aspect of the present invention, the cleaning apparatus includes the moving device that movably supports the feeding device on which the holding device for holding the workpiece is disposed. Thus, by holding the workpiece and carrying it into the cleaning region, and then, while holding the workpiece, performing exact control of the workpiece so that it is aligned with jets jetted from the nozzles disposed in the cleaning chamber, the jets can be directed onto the workpiece.

In this manner, the cleaning apparatus according to the aspect of the invention can perform cleaning by moving the workpiece to the cleaning region with the moving device while holding the workpiece with the holding device, and then jetting cleaning liquid from the nozzles while holding the workpiece. Thus, the cleaning apparatus according to the aspect of the invention is suitable for automation and can perform an efficient cleaning process by improving the workpiece carrying efficiency and the working efficiency.

The cleaning apparatus according to the aspect of the invention allows alignment of the workpiece with the nozzles in the cleaning region by moving the workpiece to the cleaning region. Thus, the nozzles can be fixedly disposed. It is therefore possible to provide the cleaning apparatus with simple structure.

Furthermore, because the nozzles are fixedly disposed, the degree of freedom in design of the liquid feed passage for feeding cleaning liquid to the nozzles is improved, so that high-pressure high-flow jets of cleaning liquid can be jetted with almost no restrictions in terms of flow rate, pressure, and arrangement space. Thus, because the plurality of nozzles can be freely arranged in the cleaning chamber, a plurality of places to be cleaned on the workpiece can be simultaneously cleaned, so that cleaning time can be shortened.

The cleaning apparatus according to the aspect of the invention includes the cover device that shields the moving device from the cleaning region and allows the feeding device to pass therethrough, thereby preventing intrusion of jets of cleaning liquid into the moving device. Therefore, the moving device can withstand operation for a long time without being subjected to cleaning liquid.

Furthermore, preferably, the feeding device includes: a first rotary saddle that is rotatable about a first axis; a second rotary saddle that is disposed on the first rotary saddle and rotatable about a second axis in a direction different from the first axis; a first driving device that rotates the first rotary saddle; and a second driving device that rotates the second rotary saddle. The holding device is disposed on the second rotary saddle, and the first and second driving devices are disposed outward of the cover device with respect to the cleaning region.

With this constitution, the first and second rotary saddles allows the biaxial rotation of the workpiece for its attitude control. Therefore, by freely adjusting the angle, suitable cleaning can be performed even for holes, etc. formed on an inclined surface of the workpiece.

Consequently, the cleaning apparatus according to the aspect of the invention is flexibly adaptable to a wide variety of workpieces and allows an improvement in productivity.

Additionally, the first and second driving devices are disposed outward of the cover device with respect to the cleaning region. Thus, the first and second driving devices are isolated and shielded from the cleaning region, thereby preventing the rotary drive devices from being subjected to cleaning liquid and improving the durability thereof.

Moreover, preferably, the cleaning apparatus further includes: a cleaning chamber that is disposed over the cleaning region and formed with a machine chamber opening; and a bed that supports the cleaning chamber and the moving device. Preferably, the cover device is mounted on the machine chamber opening, and the moving device includes: a horizontal movement guide mechanism that is placed on the bed; a moving column that is movably supported by the horizontal movement guide mechanism; an X-axis driving device that horizontally moves the moving column; a vertical movement guide mechanism that is disposed on the moving column; a Z-axis saddle that is movably supported by the vertical movement guide mechanism; and a longitudinal movement guide mechanism that is disposed on the Z-axis saddle to longitudinally movably support the feeding device.

With this constitution, the cover device is mounted on the machine chamber opening formed in the sealable cleaning chamber, and thus the moving device can be shielded and isolated from the cleaning chamber.

Additionally, the horizontal movement guide mechanism, the vertical movement guide mechanism, and the longitudinal movement guide mechanism allow the triaxial movement of the feeding device. It is therefore possible to freely move the workpiece to the cleaning region with the moving device while holding the workpiece with the holding device. Thus, the cleaning apparatus according to the aspect of the invention is more suitable for automation and can perform an efficient cleaning process by improving the workpiece carrying efficiency and the working efficiency.

Further, preferably, the X-axis driving device includes: a first X-axis driving device that horizontally moves a lower portion of the moving column; a second X-axis driving device that horizontally moves an upper portion of the moving column; and a synchronous control system that synchronizes the first and second X-axis driving devices.

With this constitution, the first X-axis driving device for horizontally moving a lower portion of the moving column, the second X-axis driving device for horizontally moving an upper portion of the moving column, and the synchronous control system allow the high-precision and high-speed movement of the workpiece while suppressing inclination and oscillation of the moving column.

Furthermore, by a simple structure, the driving devices moving in three-dimensional space can be provided. When the workpiece is large in mass and the vertical movement width is set large, unfortunately, the moving column swings from side to side, leading to a reduction in moving acceleration, so that precise positioning is impossible. With the cleaning apparatus according to the aspect of the invention, on the other hand, by synchronously driving the lower and upper portions of the moving column, the swinging and distortion of the moving column while moving can be prevented, and even when a large-mass workpiece is held, the held workpiece can be moved at a high speed with high precision.

The cleaning apparatus according to the aspect of the present invention is flexibly adaptable to a wide variety of workpieces and allows an improvement in productivity while being suitably adaptable to ultrahigh-pressure cleaning and allowing an improvement in cleaning work efficiency.

The cleaning apparatus according to the aspect of the invention can perform cleaning by moving the workpiece to the cleaning region while holding the workpiece, and then jetting cleaning liquid from the nozzles while holding the workpiece. Thus, the cleaning apparatus is suitable for automation and can be form an efficient cleaning process by improving the workpiece carrying efficiency and the working efficiency. Further, the plurality of nozzles are arranged as appropriate and a plurality of holes of the workpiece are directed toward the nozzles at a time, thereby allowing a reduction in cleaning time.

BRIEF DESCRIPTION OF THE DRAWINGS

Embodiments of the present invention will be described in detail based on the following drawings, in which:

FIGS. 6A and 6B show the construction of a cleaning tank of the cleaning apparatus according to the embodiment of the present invention, wherein FIGS. 7A and 7B each show a state in which a cleaning lance is used in the cleaning apparatus according to the embodiment of the present invention, wherein

DETAILED DESCRIPTION

A cleaning apparatus 10 according to an embodiment of the present invention will be described with reference to FIGS. 1 to 7.

Figure 1:
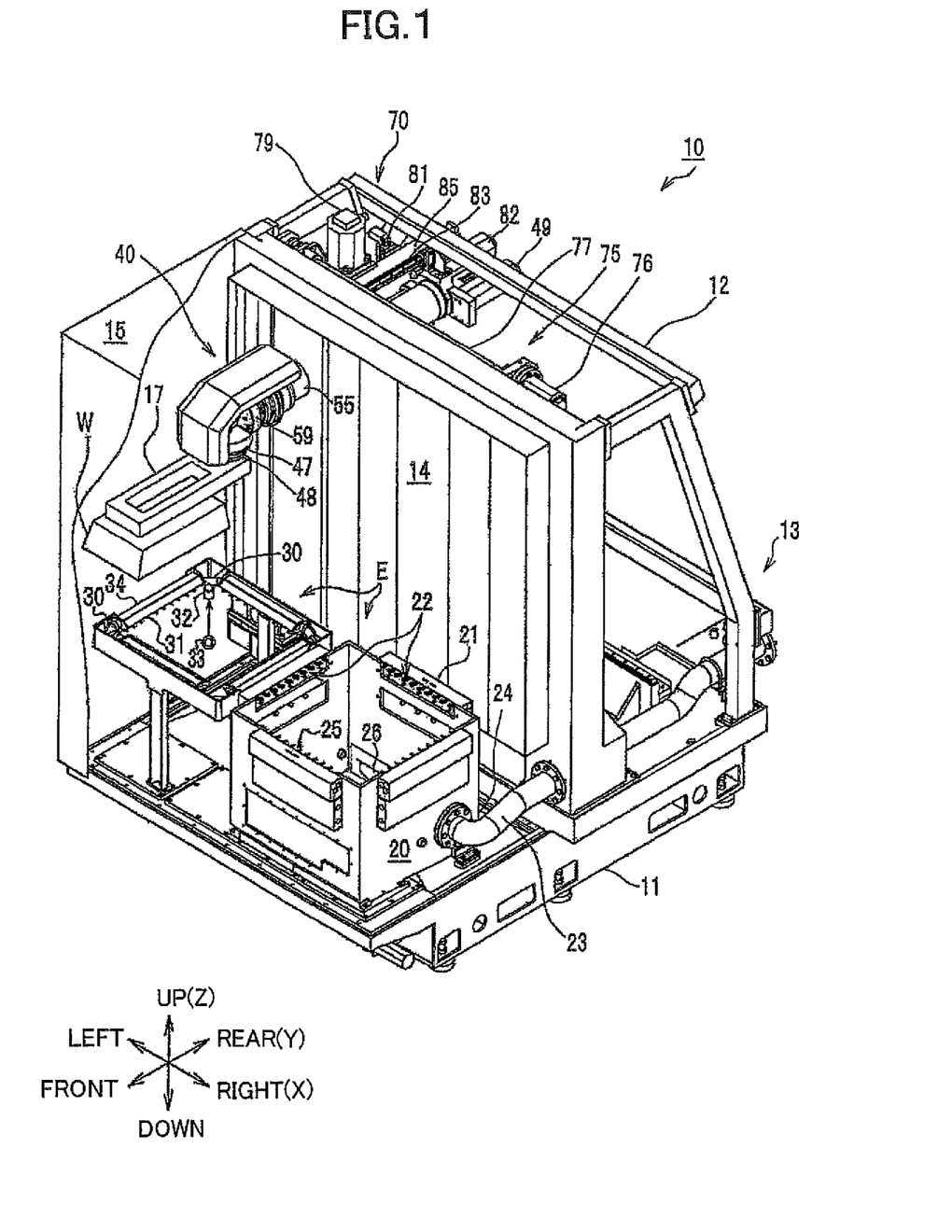
FIG. 1 is a perspective view of a cleaning apparatus according to an embodiment of the present invention as seen from the front right side.

As shown in FIG. 1, the cleaning apparatus 10 cleans a workpiece W by jetting cleaning liquid from cleaning nozzles 22, serving as nozzles, disposed in a cleaning region E. The workpiece W is moved to the cleaning region E by a feeding device 40 for cleaning.

The cleaning apparatus 10 includes an orthogonal moving device 70, serving as a moving device, on a bed 11 to the rear, and a cleaning chamber 15 forwardly. The orthogonal moving device 70 is numerically controlled. The cleaning chamber 15 includes a large machine-chamber opening 18 in the rear (see FIG. 2). The machine-chamber opening 18 is covered with a cover device 14 that is vertically and horizontally movable. Only a leading end (feeding head) of the feeding device 40 disposed on the orthogonal moving device 70 penetrates through the cover device 14 into the cleaning chamber 15 located forward. A first rotary saddle 59 is disposed on the leading end (feeding head) of the feeding device 40, and a second rotary saddle 47 is disposed on the first rotary saddle 59, coupling device 48 composed of a joint mechanism (not shown), etc., which is removably constructed, is disposed on the second rotary saddle 47. The coupling device 48 removably couples a holding device 17 on the second rotary saddle 47.

It should be noted that the following description is given, it being assumed, for purposes of description, that the horizontal direction is the X axis, the longitudinal direction is the Y axis, and the vertical direction is the 53 axis as seen from an operator (not shown) in front of the cleaning chamber 15. However, the directions or axis names of the cleaning apparatus 10 should not be taken as a limitation of the present invention.

The bed 11 is a solid base and supports the cleaning chamber 15, the orthogonal moving device 70, or the like on its upper portion. Furthermore, the bed 11 includes a waste liquid passage (not shown) for sending cleaning liquid overflowing or jetted from the cleaning chamber 15, chips, machining oil or other foreign matters generated from the workpiece W, and burrs falling from the workpiece W to a cleaning liquid tank. Further, the bed 11 fixes a control panel (not shown) for controlling the orthogonal moving device 70, a high-pressure pump, various valves, etc., and a synchronizing device 95 serving as a numerical control device.

Figure 2:
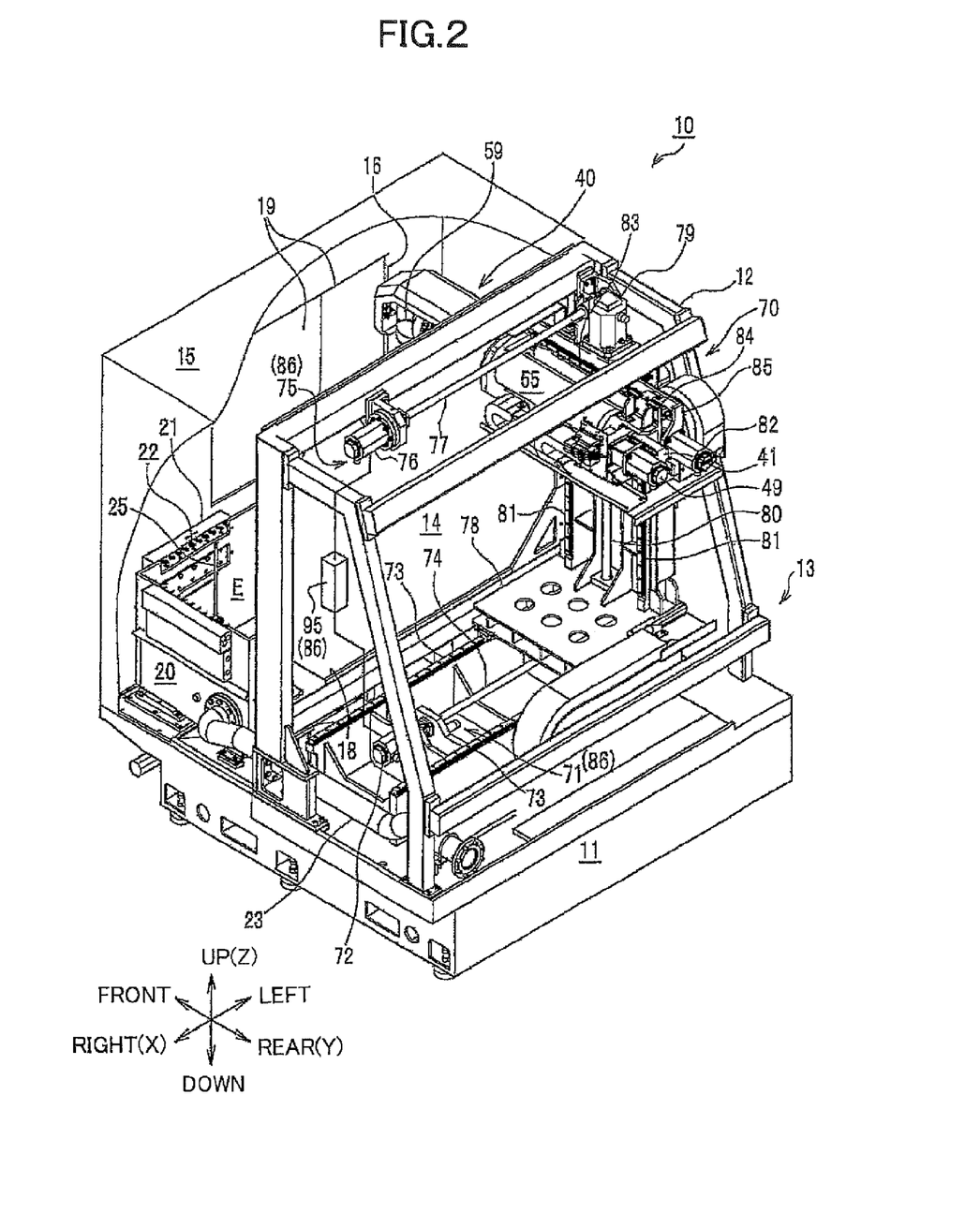
FIG. 2 is a perspective view of the cleaning apparatus according to the embodiment of the present invention as seen from the rear right side.

Referring to FIG. 2, a workpiece driving device 13, serving as a target driving device, and the orthogonal moving device 70 will be described.

The workpiece driving device 13 includes e the feeding device 40; the orthogonal moving device 70 that movably supports the feeding device 40; and the bed 11 that supports the orthogonal moving device 70.

Horizontal movement guide mechanisms 73 are arranged in parallel on the bed 11. A frame 12 surrounding the orthogonal moving device 70 is disposed upright on an upper surface of the bed 11. An X-axis driving device 86 includes a first X-axis driving device 71 disposed on the bed 11, a second X-axis driving device 75 disposed at an upper portion of the frame 12, and the synchronizing device 95. The first and second X-axis driving devices 71 and 75 are installed in parallel in the horizontal (left-right) direction to synchronously drive a moving column 78 in the X-axis direction with the synchronizing device 95.

The first X-axis driving device 71 is composed of a first X-axis ball screw 74 and a first X-axis motor 72 that rotates the first X-axis ball screw 74. A nut (not shown) of the first X-axis ball screw 74 is fixed to a bottom of the moving column 78. The second X-axis driving device 75 is composed of a second X-axis ball screw 77 and a second X-axis motor 76 that rotates the second X-axis ball screw 77. A nut (not shown) of the second X-axis ball screw 77 is fixed to a front upper portion of the moving column 78.

The orthogonal moving device 70 moves the workpiece (see FIG. 1) and therefore its movable range is very large. Furthermore, because the orthogonal moving device 70 moves the large-sized feeding device 40 to be described later, the moving column 78 is also large. Therefore, the load moment and inertia on the horizontal movement guide mechanisms 73 and the X-axis driving device 86 are very large. Also, the distortion caused by the movement of the moving column 78 becomes large. However, by driving lower (bottom) and upper portions of the moving column 78 with the separate X-axis driving devices (71 and 75) and synchronizing them, the distortion of the moving column 78 is suppressed and the moment and load inertia on each driving device can be reduced.

The moving column 78 moves along the X-axis direction and includes the Z axis as a vertical axis. A Z-axis driving device is composed of vertical movement guide mechanisms 81 that are arranged in parallel along the vertical direction on the moving column 78, a Z-axis ball screw 80, and a Z-axis motor 79 that rotates the Z-axis ban screw 80.

A Z saddle 85 moving vertically on the Z axis includes a Y-axis driving device in a direction perpendicular to the X axis and the Z axis. The Y-axis driving device includes a longitudinal movement guide mechanism 83, a Y-axis motor 82, Y-axis ball screw (not shown), and a Y saddle 84 that is movably supported by the longitudinal movement guide mechanism 83. The feeding device 40 is disposed on the Y saddle 84.

A safety cover (not shown) is disposed outside the frame 12 to shield from the outside the space (hereinafter referred to as the "machine chamber") where the orthogonal moving device 70 moves. The machine chamber is shielded from the cleaning chamber 15 including the cleaning region E by the cover device 14, thereby blocking the entrance of cleaning liquid from the cleaning chamber 15.

A telescopic or bellows cover is used as the over device 14.

Figure 3:
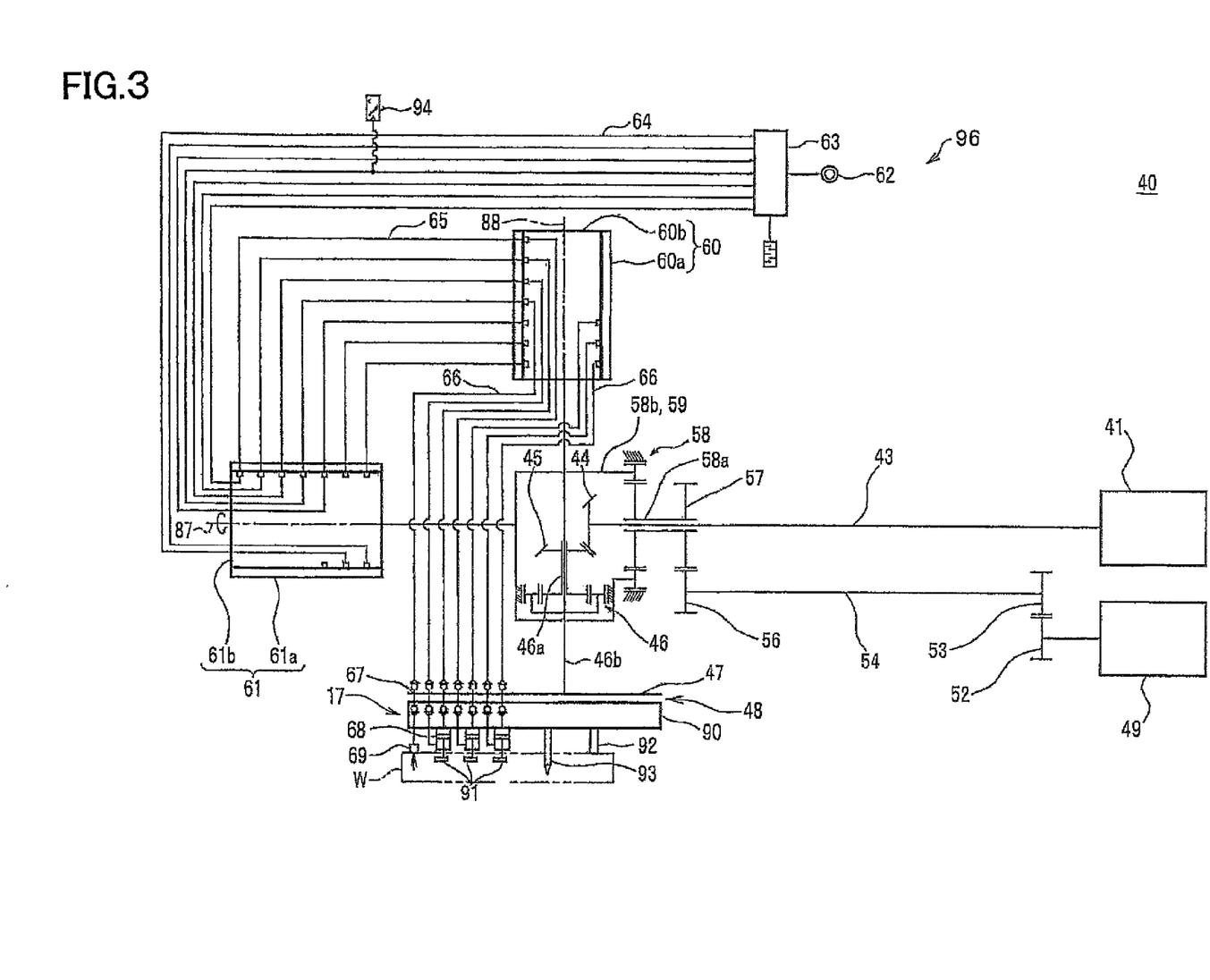
FIG. 3 a schematic diagram showing the construction of a feeding device according to the embodiment of the present invention.
Figure 4:
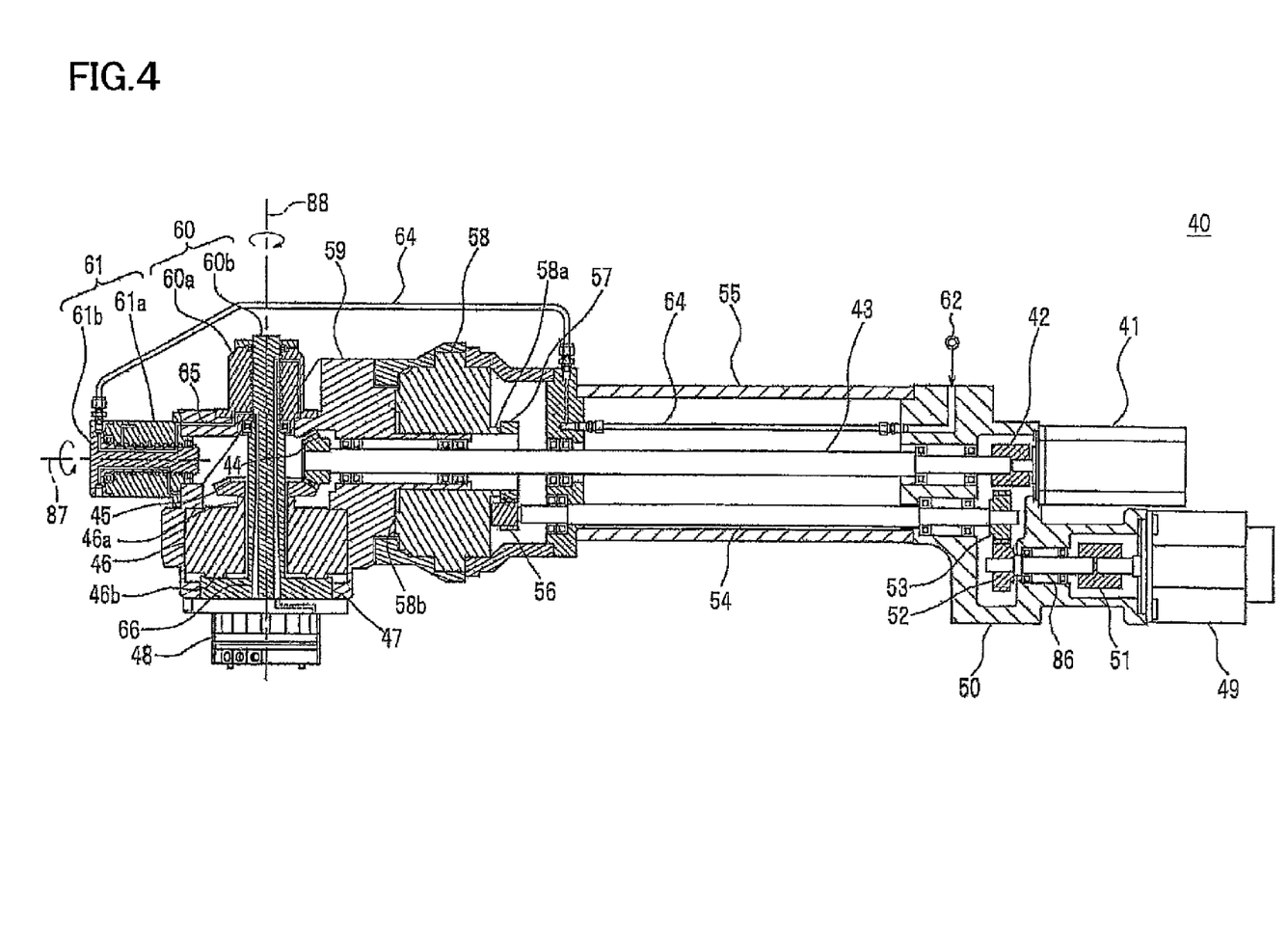
FIG. 4 is a sectional view showing the construction of the feeding device according to the embodiment of the present invention.

Referring to FIGS. 3 and 4, the feeding device 40 will be described. FIG. 3 schematically shows a power transmission system and a fluid pipe connection path of the feeding device 40. FIG. 4 is a longitudinal sectional view of the feeding device 40. FIG. 4 illustrates the second rotary saddle 47, with the first rotary saddle 59 rotated 90°.

The feeding device 40 is disposed on the Y saddle 84 of the orthogonal moving device 70 to move freely in triaxial directions with the orthogonal moving device 70. The feeding device 40 is disposed through the cover device 14, rear and inner portions thereof being isolated from the cleaning chamber 15. The orthogonal moving device 70 movably supporting the feeding device 40 is disposed at the rear of the cover device 14, thereby preventing the corrosion of the orthogonal moving device 70 due to the environment in the cleaning chamber 15.

The feeding device 40 includes a feed base 55 that is a base member having a hollow cylindrical shape; the first rotary saddle 59 that is rotatably disposed forward of the feed base 55 to rotate about a first axis 87; and the second rotary saddle 47 that is disposed on the first rotary saddle 59 to rotate about a second axis 88 perpendicular to the axis of rotation of the first rotary saddle 59. The coupling device 48 for coupling the holding device 17 is disposed at a tip of the second rotary saddle 47. A housing 50 is fixed to the rear of the feed base 55. A servomotor 49, serving as a first driving device, and a servomotor 41, serving as a second driving device, are fixed to the housing 50.

The second axis 88 is made perpendicular to the first axis 87, thereby allowing easy calculation of the attitude of the workpiece W held by the holding device 17.

It should be noted that the first axis 87 and the second axis 88 only need to be different in direction, and the angle therebetween may be, for example, 135°. The first axis 87 need not be coaxial with the feed base 55, and the center angle formed by the first axis 87 and the feed base 55 may be set to be, for example, 135°.

Furthermore, as for the servomotors 49 and 41, a motor with a brake or a fluid pressure rotating cylinder may be used in place of the servomotor. In this case, a mechanical stopper for rotation restriction is used together. An air cylinder, which uses compressed air being a compressible fluid as pressure fluid, or a hydraulic cylinder, which uses hydraulic pressure being a non-compressible fluid, may be used as the fluid pressure rotating cylinder.

The output of the servomotor 49 is transmitted to a gear 52 by a coupling 51, and then transmitted to a journaled first transmission shaft 54 by the gear 52 and a year 53. A small-diameter gear 56 is fixed to a leading end of the first transmission shaft 54 and has a meshing engagement with a large-diameter gear 57. The large-diameter gear 57 is fixed to an input shaft 58*a* of a planetary gear 58. The rotation of the servomotor 49 is transmitted to the planetary gear 58 through the first transmission shaft 54 and decelerated to be output from an output shaft 58*b* serving as a hollow shaft. The first rotary saddle 59 is journaled to the output shaft 58*b*, with a second transmission shaft 43 as its rotating shaft. The small-diameter gear 56, the large-diameter gear 57, and the planetary gear 58 constitute a first reduction gear.

The planetary gear 58 provided at the end of the power transmission system of the servomotor 49 allows a reduction in backlash of the gear mechanisms 52, 53, 56, and 57 included in the transmission system. Therefore, rotational play of the first rotary saddle 59 is reduced. Thus, the attitude of the workpiece W held by the holding device 17 can be kept with high accuracy. Further, because the first transmission shaft 54 transmits the power before deceleration, its cross-sectional area can be made small. After deceleration by the planetary gear 58, the torque increases. However, the output shaft 58*b* and the first rotary saddle 59 are directly connected, and thus the transmission system can be easily configured.

It should be noted that a cycloid reduction gear (see Japanese Published Unexamined Patent Application No. 2010-32038), an eccentric differential gearbox (see Japanese Published Unexamined Patent Application No. 2012-506005), or an eccentric oscillation type gear device (see Japanese Published Unexamined Patent Application No. 2010-91073), may be used in place of the planetary gear 58. The cycloid reduction gear is suitable because it can decelerate the driving force which is large relative to its size. Furthermore, any reduction gear may be adopted in place of the small-diameter gear 56, the large-diameter gear 57, and the planetary gear 58 as long as it has a hollow output shaft, allows the second transmission shaft 43 to penetrate into the hollow output shaft, and has an input shaft parallel to the output shaft.

The output of the servomotor 41 is transmitted directly to the second transmission shaft 43 through a coupling 42. The second transmission shaft 43 is journaled coaxially with the first rotary saddle 59 and penetrates the center of the hollow output shaft 58*b* of the planetary gear 58. Moreover, the second transmission shaft 43 is disposed at the center of the feed base 55 to serve as the rotating shaft of the first rotary saddle 59. A bevel gear 44 is fixed to a leading end of the second transmission shaft 43. A bevel gear 45 in mesh with the bevel gear 44 is fixed to an input shaft 46*a* of a planetary gear 46. The rotation of the servomotor 41 is converted to a perpendicular transmission direction by the bevel gears 44 and 45. This rotation is decelerated by the planetary gear 46 to be output from the hollow output shaft 46*b*. The bevel gears 44 and 45 and the planetary gear 46 constitute a second reduction gear. The second rotary saddle 47 having an umbrella shape is rotatably fixed to the output shaft 46*b* in such a manner as to penetrate therethrough.

The input shaft 58*a* and the output shaft 58*b* of the planetary gear 58 are formed as hollow shafts so that the second transmission shaft 43 is coaxially disposed therein. Thus, the assembly accuracy of the power transmission system can be improved. Also, the construction is simplified and production costs can be reduced.

The planetary gear 46 is provided on the output side of the bevel gears 44 and 45, thereby allowing transmission of large torque to a small space. Furthermore, backlash of the bevel gears 44 and 45 is reduced in accordance with the reduction ratio of the planetary gear 46, leading to a reduction in play of the second rotary saddle 47. Thus, the attitude of the workpiece W held by the holding device 17 can be kept with high accuracy. The second rotary saddle 47 is directly connected to the planetary gear 46, thereby simplifying the construction of the feeding device 40.

The second transmission shaft 43, which is journaled in the feed base 55, and the hollow output shaft 58*b* are coaxially arranged, and further, the first rotary saddle 59 is disposed on the second transmission shaft 43. Thus, the transmission system with compact simple structure can be obtained.

It should be noted that a reduction gear in which input and output shafts are coaxial and the output shaft is a hollow shaft, as typified by the foregoing reduction gears, may be used in place of the planetary gear 46 as the second reduction gear.

It should be also noted that the first or second reduction gear is unnecessary if the output of the servomotor 49 or 41 is sufficiently large.

Referring mainly to FIG. 3, a fluid, supply unit 96 that supplies pressure fluid from a fluid supply source 62 to a fluid pressure cylinder 68 will be described.

The fluid supply unit 96 includes a first fluid supply rotary joint 61 that is disposed on the first rotary saddle 59; a second fluid supply rotary joint 60 that is disposed on the second rotary saddle 47; a first fluid passage 64 that supplies pressure fluid from the fluid supply source 62 to the first fluid supply rotary joint 61; a second fluid passage 65 that supplies pressure fluid from the first fluid supply rotary joint 61 to the second fluid supply rotary joint 60; and a third fluid passage 66 that supplies pressure fluid from the second fluid supply rotary joint 60 to the fluid pressure cylinder 68.

On the side (i.e., leading end) of the first rotary saddle 59 on which the holding device 17 is disposed, the first fluid supply rotary joint 61 is disposed coaxially with a rotating shaft of the first rotary saddle 59. The first fluid supply rotary joint 61 is composed of: a shaft body 61*b* that is fixed coaxially with the rotating shaft of the first rotary saddle 59; and a housing 61*a* that is journaled to the outer periphery of the shaft body 61*b* to rotate along with the first rotary saddle 59.

On the side (i.e., rear end) of the second rotary saddle 47 opposite the holding device 17, the second fluid supply rotary joint 60 is disposed coaxially with the second rotary saddle 47. The second fluid supply rotary joint 60 is composed of: a housing 60*a* that is fixed to the first rotary saddle 59; and a shaft body 60*b* that is journaled to an inside of the housing 60*a* to form a portion of the second rotary saddle 47.

The fluid supply source 62 (see FIG. 3) is connected to a valve unit 63. The fluid supply source 62 supplies compressed air. The first fluid passage (pipe) 64 allows the valve unit 63 and the shaft body 61*b* of the first fluid supply rotary joint 61 to communicate with each other. The first fluid passage 64 extends through the inside of the feed base 55 to a leading end of the feed base 55 and passes laterally to a rotation space of the first rotary saddle 59 to be connected to the fluid supply rotary joint 61 (see FIG. 4). The second fluid passage 65 passes through the inside of the first rotary saddle 59 from the housing 61*a* of the fluid supply rotary joint 61 to communicate with the housing 60*a* of the second fluid supply rotary joint 60. The third fluid passage 66 passes through the shaft body 60*b* and the inside of the second rotary saddle 47 to communicate with a fluid coupling 67 of the coupling device 48.

It should be noted that the fluid to be supplied by the fluid supply source 62 is not limited to compressed air, but may include any fluid that functions as a driving source and does not contaminate the workpiece W, the holding device 17, a cleaning tank 20, and the cover device 14.

A plurality of the first to third fluid passages 64, 65, and 66 are provided for bringing various fluid devices disposed on the holding device 17 into communication with the valve unit 63. The valve unit 63 is an assembly of multiple directional control valves to select the flow passage for each fluid supplied from the fluid supply source 62.

The rotating shafts of the two rotary saddles 59 and 47 disposed coaxially with the fluid supply rotary joints 61 and 60, respectively, are connected by the first to third fluid passages 64, 65, and 66, thereby allowing supply of pressure fluid to the freely rotatable second rotary saddle 47. The supplied pressure fluid is used as the driving source of the holding device 17 for holding the workpiece W.

Because the second fluid passage 65 and the third fluid passage 66 are freely rotated by the fluid supply rotary joints 61 and 60, metal pipes can be used as the first to third fluid passages 64, 65, 56. Although the leading end portion of the feeding device 40 moves inside the cleaning chamber 15 is subjected to high-pressure cleaning liquid and cleaning liquid vapor, greater durability can be given to the pipes by supplying fluid pressure through the metal pipes.

The coupling device 48 including the fluid coupling 67 is disposed on the leading end of the second rotary saddle 47. The coupling device 48 is formed of the so-called "easy release joint" and has the function of coupling the second rotary saddle 47 and the holding device 17 at a precise position and concurrently supplying Pressure fluid to the holding device 17 with the fluid coupling 67.

The fluid coupling 67 has the function of supplying pressure fluid from the second fluid supply rotary joint 60 to the fluid pressure cylinder 68 or the like when the coupling device 48 couples the holding device 17 and the second rotary saddle 47, and shutting off the supply of pressure fluid when the coupling device 48 detaches the holding device 17 and the second rotary saddle 47 from each other.

By this construction, the holding devices 17 of various shapes can be removably mounted so as to fit various types of workpieces W. Thus, it is possible to prepare for making a change in production or introducing a new model concurrently while the cleaning apparatus 10 is in operation.

That is, the holding devices 17 holding the workpiece W needs to be variously designed in accordance with the shapes of the workpieces W. Furthermore, in the case where a method (mixed production method) for simultaneously producing a plurality of types of workpieces W is used, when the shape or type of the workpiece W is changed, the holding device 17 needs replacement. The coupling device 48 enables the automatic replacement of the holding devices 17 by preparing a plurality of the holding devices 17 to be attached to the feeding head of the feeding device 40 and attaching/detaching the various holding devices 17 to/from the cleaning apparatus 10 in accordance with the workpiece W flowing in a production line. Therefore, also in the mixed production method, the need for operations for replacing the holding device 17 can be eliminated, and the productivity can be improved.

Referring to FIG. 3, the holding device 17 will be described. The holding device 17 includes a frame 90, and the fluid pressure cylinder 68, a seating pin 92, a positioning pin 93, and a fluid nozzle 69 for seating detection which are fixed to the frame 90. The fluid pressure cylinder 68 and the fluid nozzle 69 for seating detection are supplied with pressure fluid through the fluid coupling 67. The fluid pressure acting on each device is controlled in supply and reduction by the valve unit 63.

The workpiece W is seated on the frame 90 by a plurality of the seating pins 92 and positioned on a seating face by the positioning pin 93. A clamper 91 is attached to a piston shaft of the fluid pressure cylinder 68, and opens and closes in response to the movement of the piston shaft. When the clamper 91 is closed, the workpiece W is fixed to the seating face. The fluid nozzle 69 is installed on the seating face for the workpiece W, and closed when the workpiece W is seated. When the fluid nozzle 69 is closed in response to the seating of the workpiece W, the pressure in the first fluid passage 64 connected to the fluid nozzle 69 rises near a supply pressure. Thus, the seating of the workpiece W can be detected by a pressure switch 94. It should be noted that a pressure sensor may be used in place of the pressure switch 94.

The cleaning chamber 15 provides the space (cleaning region E and work region E) for cleaning (including operations such as air blowing and debarring) the workpiece W by jetting cleaning liquid. The cleaning chamber 15 is brought into close contact with the bed 11 to shield its inside from the outside of the cleaning apparatus 10. The shielding function of the cleaning chamber 15 prevents cleaning liquid from leaking to the outside of the cleaning apparatus 10. The cleaning chamber 15 includes a carry-in entrance 16 (see FIG. 2) for carrying in the workpiece W from the outside. The carry-in entrance 16 is sealed by a carry-in door 19.

Figure 5:
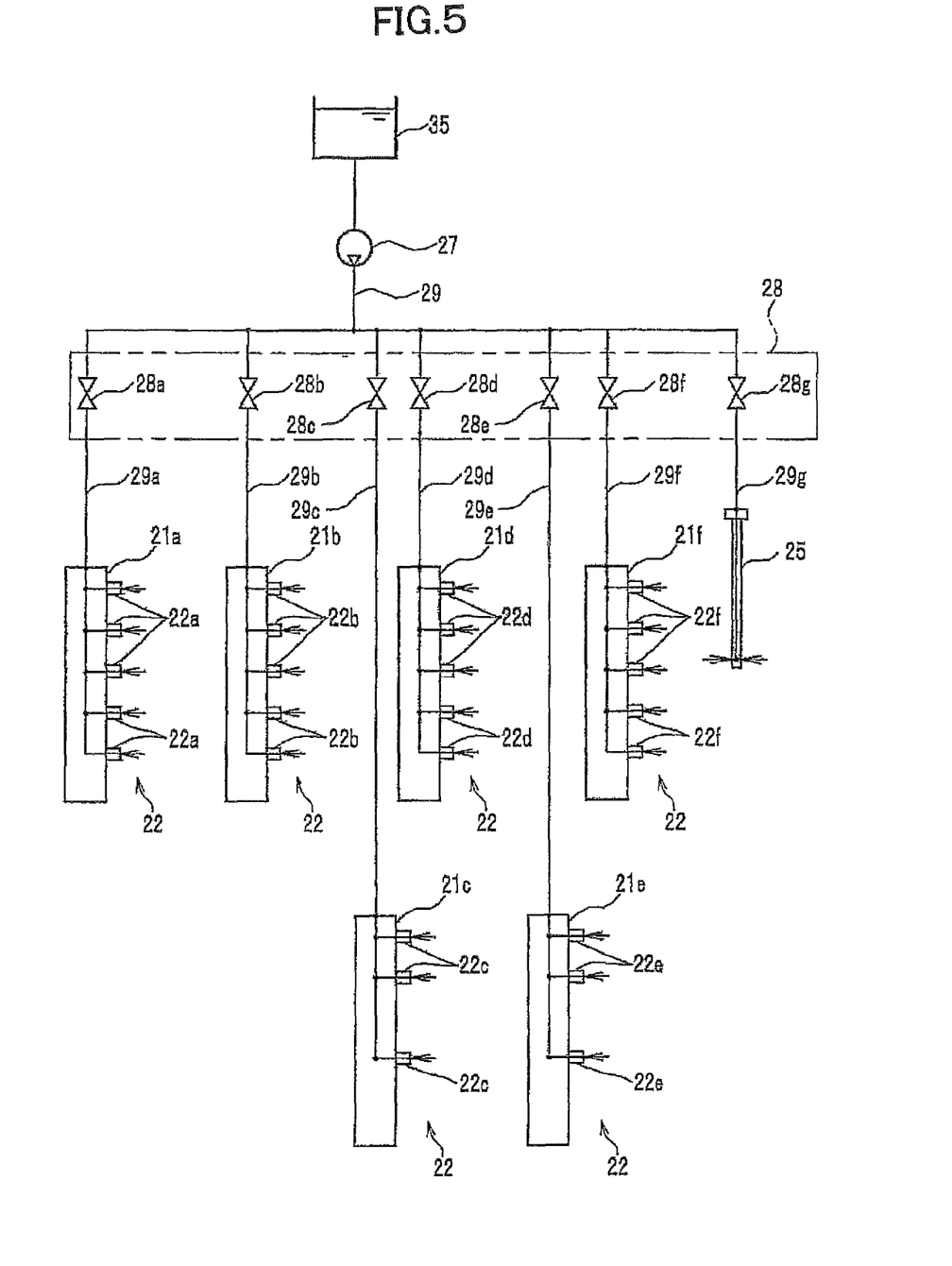
FIG. 5 is a hydraulic circuit diagram showing a flow passage of high-pressure cleaning liquid in the cleaning apparatus according to the embodiment of the present invention.
Figure 6A:
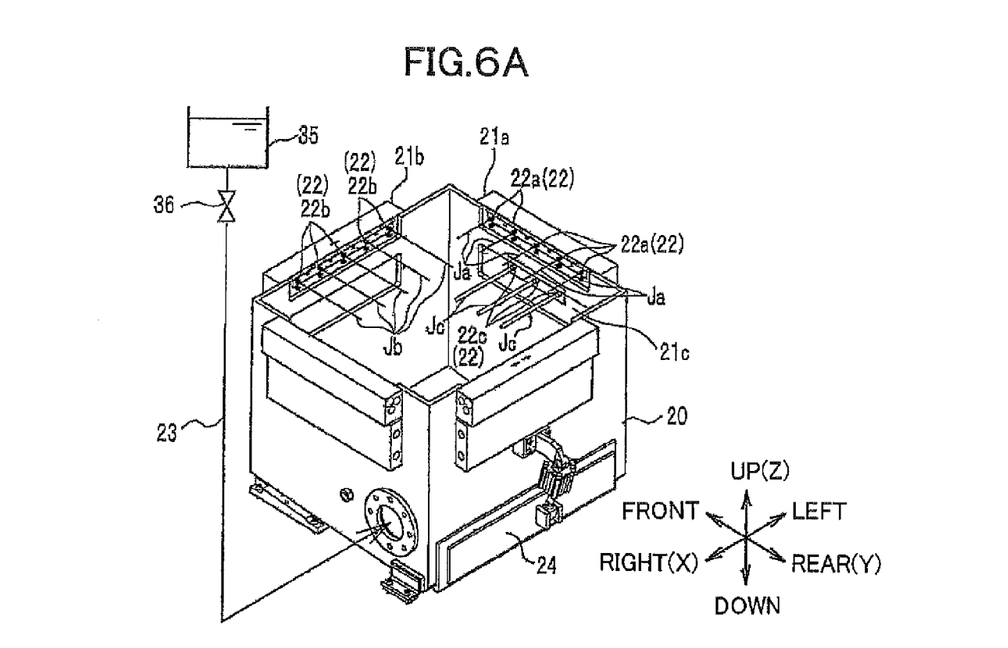
FIG. 6A is a perspective view thereof as seen from the rear right side.
Figure 6B:
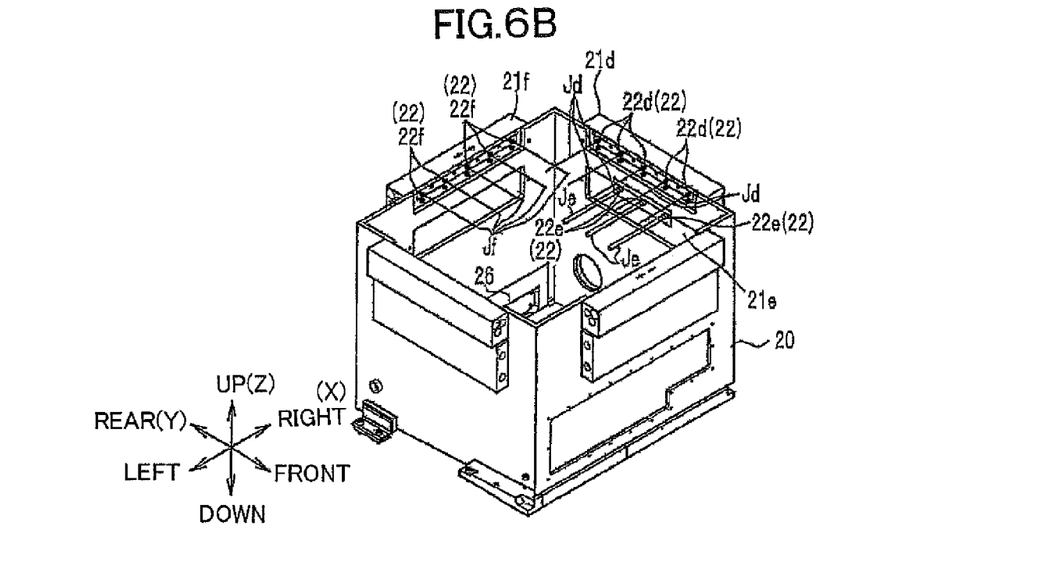
FIG. 6B is a perspective view thereof as seen from the front left side.

The cleaning tank 20 constituting the cleaning region (including the work region) E is fixedly installed within the cleaning chamber 15. Referring to FIGS. 5 and 6, the cleaning tank 20 and high-pressure cleaning will be described. A drain outlet 26 and a drain valve 24 are disposed at the bottom of the cleaning tank 20. The drain valve 24 opens and closes the drain outlet 26. The drain outlet 26 is sufficiently large relative to the capacity of the cleaning tank 20, thereby allowing considerable reduction in drain time and contributing to shortening of cleaning time. Because the drain valve 24 is installed so as to open and close the drain outlet 26, the cleaning tank 20 can be filled with cleaning liquid. The drain valve 24 allows the filling of the cleaning tank 20 with cleaning liquid and the discharge of cleaning liquid, and therefore the cleaning apparatus 10 can selectively perform in-air cleaning and in-water cleaning.

During in-water cleaning, chips or burrs falling from the workpiece W can float on cleaning water in the cleaning tank 20. These chips or burrs can redeposit on the workpiece W while the liquid level of cleaning liquid is lowered in draining. Because the drain valve 24 is sufficiently large relative to the volume of the cleaning tank 20, the lowering of the liquid level of cleaning liquid in draining is accelerated. Thus, the redeposition of the chips or burrs on the workpiece W is reduced.

A water supply pipe 23 communicates with a clean tank 35 (see FIG. 6A). A water supply valve 36 is provided at an inlet port of the water supply pipe 23. The water supply valve 36 normally closed, and opened only during water supply. When the water supply valve 36 is opened, the cleaning liquid filled in the clean tank 35 flows into the cleaning tank 20 under the action of the water pressure. The cleaning tank 20 is provided with a liquid level gauge (not shown). And when a "FULL" water level is detected, the water supply valve 36 is closed. If the water level of the clean tank 35 is set high, water supply is performed by the water pressure in the clean tank 35, so that the structure can be simplified.

It should be noted that, a timer may be provided in place of installation of the liquid level gauge for controlling the valve-opening time of the water supply valve 36 so that the water supply valve 36 can be opened only when the cleaning tank 20 becomes the full water level.

A high-pressure pump 27 pressurizes cleaning liquid in the clean tank 35 to the range of 10 to 100 MPa. The pressurized liquid is sent through a cleaning liquid passage 29, and distributed among nozzle blocks 21a to 21f a valve unit 28. The valve unit 28 is provided with opening/closing valves 28a to 28g whose number is the same as the distribution number. The opening/closing valves 28a to 28f communicate with the nozzle blocks 21a to 21f through cleaning liquid passages 29a to 29f, respectively. Cleaning nozzles 22a to 22f are disposed on the nozzle blocks 21a to 21f, respectively. Each of the nozzle blocks 21 is disposed on a side surface of the cleaning tank 20 and jets Ja to Jf can be jetted from the cleaning nozzles 22a to 22f, respectively, in a plurality of directions from a plurality of surfaces. Because cleaning liquid can be simultaneously jetted from the many cleaning nozzles 22 (nozzle groups 22a to 22f), a large number of jets are generated in the cleaning tank 20. The opening/closing valve 28g communicates with a cleaning lance 25 through a cleaning liquid passage 29g.

Jetting is performed by dividing the cleaning nozzle groups 22 into a plurality of cleaning paths, thereby allowing a reduction in the amount of cleaning liquid to be simultaneously jetted. The cleaning nozzle groups 22 are arranged so as to conform to the shape of the workpiece W, thereby allowing efficient cleaning of the workpiece W. The arrangement of the many cleaning nozzles 22 causes an increase in the necessary electric capacity of the high-pressure pump 27. By dividing the cleaning nozzles 22 into a plurality of groups and sequentially performing jetting for each group, the necessary electric capacity of the high-pressure pump 27 can be reduced.

Figures 7A, 7B:
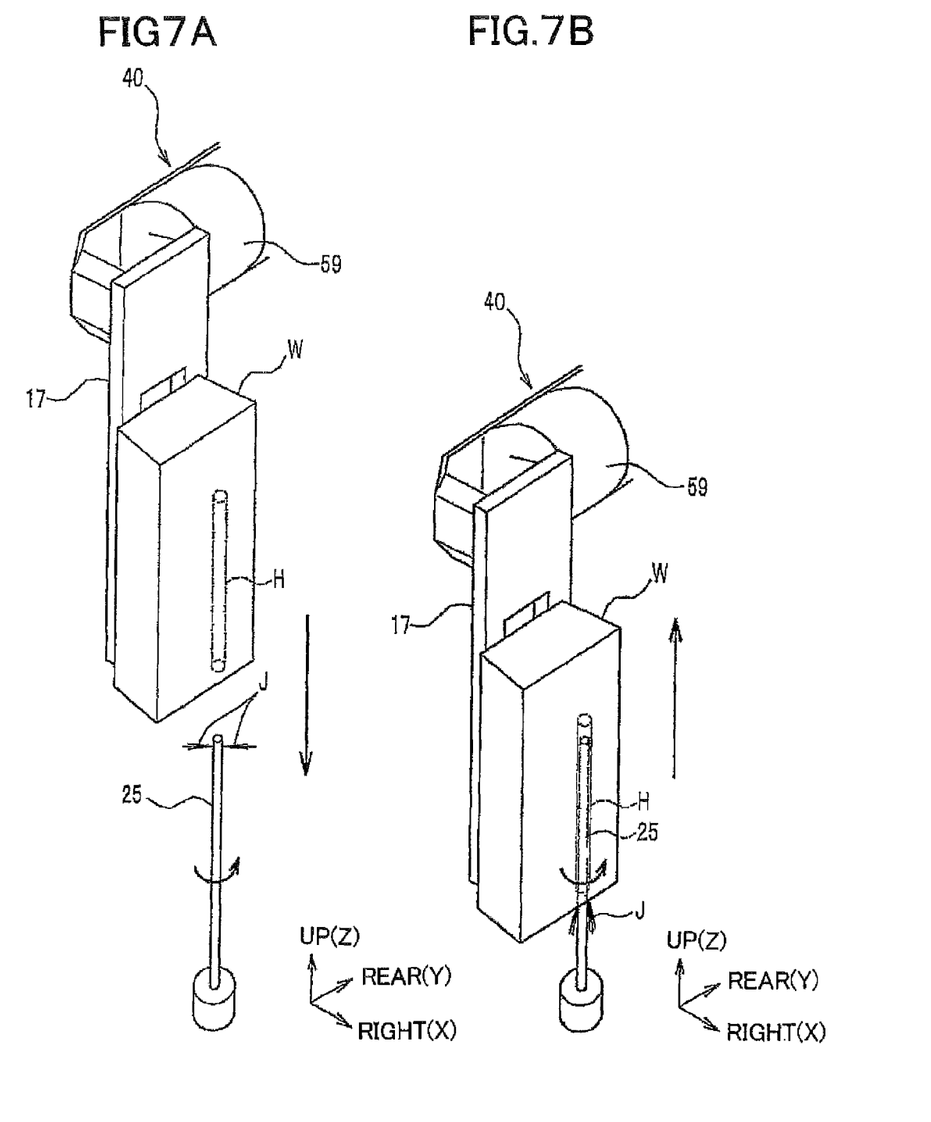
FIG. 7A shows the state before insertion of a workpiece into the cleaning lance.
FIG. 7B shows the state after insertion of the workpiece into the cleaning lance.

Referring to FIG. 7, the cleaning lance 25 will be described. The cleaning lance 25 has a vertically-elongated shaft to horizontally jet high-pressure water from a tip of the shaft. The cleaning lance 25 is journaled to the vicinity of a lower surface of the cleaning tank 20. In the case of using the cleaning lance 25, the cleaning lance 25 is supplied with high-pressure water for rotation. Thereafter, a hole portion H of the workpiece W is positioned above the cleaning lance 25 so that the axis of the hole portion H is aligned with a rotating shaft of the cleaning lance 25 (see FIG. 7A). Then the orthogonal moving device 70 moves the workpiece W downward so that the cleaning lance 25 is inserted into the hole portion H (see FIG. 7B). After the completion of cleaning, the workpiece W is moved upward so that the cleaning lance 25 is removed from the workpiece W. The cleaning lance 25 passes through the inside of the hole portion H of the workpiece W while rotating, thereby performing cleaning of the inside of the hole portions H or a hole crossing the hole portion H. Furthermore, the cleaning lance 25 can remove burrs by directing high-pressure water onto burrs on the crossing hole in the hole portion H.

It should be noted that the cleaning tank 20 is unnecessary if cleaning in water (in-water cleaning) of the workpiece W is not performed. In the case of not including the cleaning tank 20 in the cleaning chamber 15, the cleaning nozzles 22 or the cleaning lance 25 is directly disposed within the cleaning chamber 15. In this case, the region surrounded by the cleaning nozzle groups 22 serves as the cleaning region E.

Furthermore, although the single cleaning lance 25 is disposed so as to extend vertically from a lower portion of the cleaning tank 20, the direction and number of installation of the cleaning lance 25 may be changed as appropriate according to the size of the workpiece W, the number of workpieces W held by the holding device 17, and the installation method of the cleaning nozzles 22. For example, the same number of the cleaning lances 25 as the number of the workpieces W held by the holding device 17 may be installed.

As shown in FIG. 1, within the cleaning chamber 15, air blow pipes 30 are fixedly installed on the bed 11. The air blow pipes 30 form a rectangular frame and are mounted with a plurality of air blow nozzles 31 and 34 facing the inside of the air blow pipes 30. An air blow pipe 32 communicates with the air blow pipes 30. Dry air for air blowing is pressurized by a blower 33 to be supplied to the air blow nozzles 31 and 34 through the air blow pipe 32.

It should be noted that compressed air may be used in place of air sent from the blower 33 as dry air for air blowing. Furthermore, pipe nozzles, broom nozzles, or knife nozzles may be used as the air blow nozzles 31 and 34.

The cleaning apparatus 10 according to the embodiment of the present invention holds the workplace W outside the cleaning chamber 15 with the holding device 17 disposed at the leading end (feeding head) of the feeding device 40. Then the cleaning apparatus 10 takes the workpiece W into the cleaning region E in the cleaning chamber 15 through the carry-in entrance 16 (see FIG. 2) while holding the workpiece W. The cleaning apparatus 10 properly controls the position and attitude of the workpiece W in the cleaning chamber 15 with the orthogonal moving device 70 so that the workpiece W is directed toward the cleaning nozzles 22 fixedly installed within the cleaning chamber 15. The cleaning nozzles 22 jet cleaning liquid to clean the workpiece W directed toward the cleaning nozzle 22 with the jets Ja to Jf (see FIG. 6) of cleaning liquid.

Because the feeding device 40 holds the workpiece W outside the cleaning apparatus 10 and carries it into the cleaning region E, a device for carrying the workpiece W into the cleaning apparatus 10 is unnecessary. Therefore, the cleaning apparatus 10 can be very easily incorporated into the process line.

Because the many cleaning nozzles 22 are installed on the nozzle block 21, the cleaning apparatus 10 can simultaneously clean many portions to be cleaned of the workpiece W, thereby allowing shortening of cleaning time. If the nozzle block 21 is designed for the shape of the workpiece W, cleaning of necessary portions to be cleaned can be completed just by moving the workpiece W to designed attitude and position several times.

The many air blow nozzles 31 and 34 are arranged inside the air blow pipes 30 formed in the rectangular frame shape. Thus, almost all of cleaning liquid adhering to the workpiece W can be removed just by causing the workpiece W to pass through the inside of the air blow pipes 30.

Because the cleaning apparatus 10 is driven by the numerical control device, a cleaning program can be easily created.

Moreover, in the case of moving the cleaning nozzles 22, a liquid supply unit that supplies high-pressure cleaning liquid to the cleaning nozzles 22 needs to include a flexible hose, a fluid supply rotary joint and other movable portions so as to cope with the movement of the cleaning nozzles 22. In this case, the liquid supply unit needs to be designed to prevent its interference with a moving device for the cleaning nozzles 22 and prevent its contact with high-pressure jets jetted from the cleaning nozzles 22, leading to increased design restrictions and the complexity of the device.

On the other hand, however, in the cleaning apparatus 10 according to this embodiment, the cleaning nozzles 22 are fixedly installed, and therefore the construction of the liquid supply unit can be simplified. Furthermore, the cleaning liquid passage 29 can be fixed, thereby increasing the flexibility in its design.

In the case of moving the cleaning nozzles 22, it is necessary to embed the liquid supply unit inside the nozzle moving device. Inside the nozzle moving device, the size and movable range are restricted. The elements, such as pipes and joints, constituting the liquid supply unit have restrictions on supply flow rate and supply pressure, and once they are designed, changes in supply flow rate and supply pressure are not easy. In the cleaning apparatus 10 according to this embodiment, the liquid supply unit can be fixed, and therefore the supply flow rate and supply pressure can be easily changed. Consequently, the cleaning apparatus 10 can be easily employed for ultrahigh-pressure cleaning or large flow cleaning.

Further, the orthogonal moving device 70 allows the workpiece W to move in a free attitude. In the case of deburring the workpiece W, it is necessary to direct jets onto burrs in such a manner that the jets go over the area of the workpiece W where burrs are generated. Because the orthogonal moving device 70 is used as the moving device, the positioning accuracy, repeatability, or locus accuracy of the workpiece W can be set high as compared with the multi-joint robot composed of the combination of rotation nodes. Thus, high deburring performance can be obtained. In addition, in the case of inserting the workpiece W into the cleaning lance 25, even if the clearance between the cleaning lance 25 and the workpiece W is small, the interference therebetween can be prevented.

Furthermore, the cleaning apparatus 10 of this embodiment includes the orthogonal moving device 70 as the moving device, and thus is easy to use for an operator under simple control.

In the case where the workpiece W as a heavy object is held by the multi-joint robot, a large centrifugal force acts on the rotating shaft constituting the multi-joint robot, and therefore it is impossible to ensure the positional accuracy when swinging the workpiece W at a high speed.

On the other hand, the cleaning apparatus 10 of this embodiment includes the orthogonal moving device 70 as the moving device, thereby allowing swinging of the workpiece W at a high speed. In the cleaning apparatus 10 of this embodiment, the many cleaning nozzles 22 are arranged on the four surfaces. Thus, by moving up and down while swinging the workpiece W, a wide surface can be subjected to high-pressure cleaning at a time and a high cleaning effect can be obtained in a short cleaning time.

The cleaning apparatus 10 swings and moves the workpiece W with the feeding device 40. Therefore, a large space and stroke for movement is required. The orthogonal moving device is constructed such that the Z saddle 85 is disposed on the moving column 78 and the Y saddle 84 is disposed on the Z saddle 85, thereby allowing less arrangement space. Furthermore, because the moving column 78 has a large dimension and, includes the large workpiece W and the feeding device 40 at its leading end, a large load is applied to the X axis and the moving column 78. The cleaning apparatus 10 includes the two X-axis driving devices 71 and 75 for synchronously driving the upper and lower portions of the moving column 78, thereby suppressing the distortion of the moving column 78, lowering the rigidity of the moving column 78 and the bed 11, and allowing miniaturization of the cleaning apparatus 10. Additionally, the increase in size of the moving device is facilitated.

The feeding device 40 can rotate the holding device 17 holding the workpiece W with the first rotary saddle 59 and the second rotary saddle 47, which constitute the two-axis rotating shafts perpendicular to each other. Thus, the feeding device 40 can freely select the attitude of the workpiece W. Therefore proper cleaning operation even can be performed for the workpiece W having a complicated shape, so that the amount of foreign matters left on the workpiece W can be reduced. Furthermore, while in the case of removing a burr adhering to the workpiece W, it is necessary to direct high-pressure jets onto the burr at an angle suitable for the burr, and the feeding device 40 allows a free attitude of the workpiece W, thereby allowing removal of the burr adhering to a surface of the workpiece W having a complicated shape.

The planetary gear 58 is mounted to a leading end of the driving system, thereby reducing backlash of the first rotary saddle 59, and the planetary gear 46 is mounted to a leading end of the driving system, thereby reducing backlash of the second rotary saddle 47. Thus, the attitude of the workpiece W can be precisely controlled.

The cleaning nozzles 22 are fixed to the cleaning tank 20, and thus can be accurately positioned with respect to the workpiece driving device 13. Furthermore, the cleaning nozzles 22 are less susceptible to vibrations of the moving portions. Therefore, the relative position of the workpiece W, which is moved with high positional accuracy by the workpiece driving device 13, and the cleaning nozzles 22 accurately matches with a programmed position.

The constructions being such that the position and attitude of the workpiece W are precisely controlled and being such that the cleaning nozzles 22 are positioned with high assembling accuracy and are less susceptible to vibrations combine to give a high cleaning and deburring capacity to the cleaning apparatus 10 of this embodiment.

The servomotor 49 serving as the first driving device and the servomotor 41 serving as the second driving device are disposed, outward of the cover device 14 with respect to the cleaning region E. Moreover, mechanical elements for transmitting the driving force of the servomotors 49 and 41 are disposed inside the feed base 55, and therefore isolated from the cleaning region E.

Thus, the servomotors 49 and 41, the moving device 70, and the drive power transmission system are prevented from coming into contact with jets or vapors of cleaning liquid. Therefore, durability can be given to the feeding device 40, the workpiece driving device 13, or the cleaning apparatus 10 of this embodiment.

The holding device 17 or the coupling device 48 is exposed to high-pressure jets and high-temperature vapor. In general, electric components have poor resistance thereto because they have contacts. Furthermore, damage of an electric-wire protector causes an electric short, leading to breakage. Because the holding device 17 holds and swings the workpiece W, damage of the holding device 17 might exert a critical adverse influence on the whole apparatus. In the case of the holding device 17 or the coupling device 48 including electrical components, the fluid is supplied as the driving source thereof, and therefore the reliability of the holding device 17 is enhanced.

While an embodiment of the present invention has been described above, the invention is not limited to the above-described embodiment, and specifications can be changed as appropriate.

For example, a decompression container having an opening may be provided in place of the air blowing region serving as the work region E for communication between itself and a pressure reducing pump. On the other hand, a sealing cover for sealing the opening of the decompression container is provided on the holding device 17. The feeding device 40 puts the workpiece W after cleaning into the decompression container through the opening. The opening of the decompression container is sealed with the sealing cover of the holding device 17. Then, when the coupling device 48 is released, the workpiece W is held within the decompression container sealed with the sealing cover of the holding device 17. When the pressure in the decompression container is reduced by the pressure reducing pump and becomes lower than the vapor pressure of the left cleaning liquid, the cleaning liquid adhering to the workpiece W is vaporized and the workpiece W is dried. The feeding device 40 released from the coupling device 48 is coupled to the other holding device 17A, and then the holding device 17A holds the other workpiece W to be cleaned in the cleaning region E. With this construction, while the workpiece W is dried under reduced pressure, the other workpiece W can be held to be cleaned.

What is claimed is:

1. A cleaning apparatus for cleaning a workpiece by jetting cleaning liquid from nozzles disposed in a cleaning region, comprising:
   a moving device;
   a feeding device disposed on the moving device, the feeding device being disposed facing the cleaning region and configured to hold and move the workpiece, the feeding device including:
      a feed base;
         a first rotary saddle disposed on a forward of the feed base, the first rotary saddle being rotatable about a first axis;
         a second rotary saddle disposed on the first rotary saddle, the second rotary saddle being rotatable about a second axis in a direction different from the first axis; and
      a holding device disposed on the feeding device and configured to hold the workpiece, the holding device having a fluid pressure cylinder configured to hold the workpiece;
      the moving device configured to movably support the feeding device;
   a fluid supply unit configured to supply pressure fluid from a fluid supply source to the fluid pressure cylinder, the fluid supply unit including:
      a first fluid supply rotary joint being disposed on the first rotary saddle, the first fluid supply rotary joint being rotatable about the first axis;
      a second fluid supply rotary joint being disposed on the second rotary saddle, the second fluid supply rotary joint being rotatable about the second axis;
      a first fluid passage configured to supply pressure fluid from the fluid supply source to the first fluid supply rotary joint;
      a second fluid passage configured to supply pressure fluid from the first fluid supply rotary joint to the second fluid supply rotary joint; and
      a third fluid passage configured to supply pressure fluid from the second fluid supply rotary joint to the fluid pressure cylinder;
   a nozzle disposed in the cleaning region, and
   a cover device configured to shield the moving device from the cleaning region and allow the feeding device to pass therethrough such that the first rotary saddle and the nozzle are located in the cleaning region,
   wherein the feeding device is configured to move the workpiece to the cleaning region for cleaning.

2. The cleaning apparatus according to claim 1, further comprising:
   a cleaning chamber that is disposed over the cleaning region; and
   a carry-in/out port that is disposed in the cleaning chamber and configured for carrying the workpiece in and out from outside, wherein
   the feeding device is configured to carry the workpiece into the cleaning region from the outside through the carry-in/out port while holding the workpiece, or carry the workpiece out of the cleaning region through the carry-in/out port while holding the workpiece.

* * * * *